Feb. 19, 1935.   L. B. GOLDBERG ET AL   1,991,666
RIFFLE PAN
Filed March 26, 1934

Inventors
Louis B. Goldberg,
Nathan Goldberg,
William Goldberg,
Jacob M. Goldberg.
By A. J. O'Brien
Attorney Patented Feb. 19, 1935

1,991,666

UNITED STATES PATENT OFFICE 1,991,666

RIFFLE PAN

Louis B. Goldberg, Nathan Goldberg, William Goldberg, and Jacob M. Goldberg, Denver, Colo.

Application March 26, 1934, Serial No. 717,406

6 Claims. (Cl. 209—506)

This invention relates to improvements in riffle pans of the type employed in connection with placer mining machines.

In separating gold and other heavy metals from placer sand and gravel, the coarse placer material is first passed through a screen where the larger particles are removed and this is often times combined with a scrubber that subjects the material to a cleaning or scrubbing action that removes the soil and metal particles from the placer gravel. After the material has been passed through the screen and scrubber, the finer portions or those that pass through the screen are delivered to one end of a riffle pan where the fines mixed with water are subjected to agitation whereby the heavier or valuable metal particles are separated from the gangue particles, and, due to their greater specific gravity, pass to the bottom of the riffle pan and become lodged in the grooves with which the upper surface of the bottom of the riffle pan is provided.

Many different kinds of riffle pans have been devised for use with placer mining machines and with practically all of them some results are obtained, but experiments have shown that even with the best riffle pans, values are lost that might have been saved if the riffle pans had been properly constructed.

It is the object of this invention to produce an improved riffle pan that can be substituted for similar riffle pans now in use and which, due to its improved construction, will be more efficient than those ordinarily employed.

Another object of this invention is to produce a riffle pan of such a design that it can be molded from rubber composition and which will, therefore, be cheaper to construct than riffle pans made of metal and which will also be proof against serious damage due to rough handling.

Another object is to produce a riffle pan having a peculiar construction of riffles that will make it possible to collect finer particles of gold and precious metals than can usually be collected with riffle pans of ordinary construction.

This invention, briefly described, consists of a riffle pan having a bottom which is substantially straight in a transverse direction, and which is provided with upwardly inclined edges at opposite sides so as to form a cross section of a rough-like appearance. The upper surface of the riffle pan is provided with a plurality of transversely extending riffle grooves of substantially triangular cross section. The grooves extend entirely across the bottom and up along the inclined sides. The upper surface of the bottoms of the grooves are provided with parallel riffle grooves of substantially triangular cross section, but which are much smaller than the main grooves so that there will be several of the smaller grooves in the bottom of each large groove. The receiving end of the riffle pan has an inclined bottom section that is provided with a plurality of transversely extending triangular riffle grooves of substantially the same shape and size as those in the upper surface of the larger grooves.

Having thus briefly described the invention, the same will now be described in detail, and for this purpose, reference will be had to the accompanying drawing in which the preferred embodiment of the invention has been illustrated, and in which.

Figure 1:
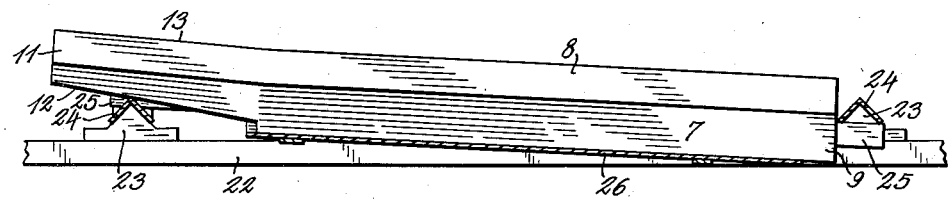
Fig. 1 is a side elevation of the improved riffle pan showing the same in place on a frame that forms part of a placer mining machine.
Figure 2:
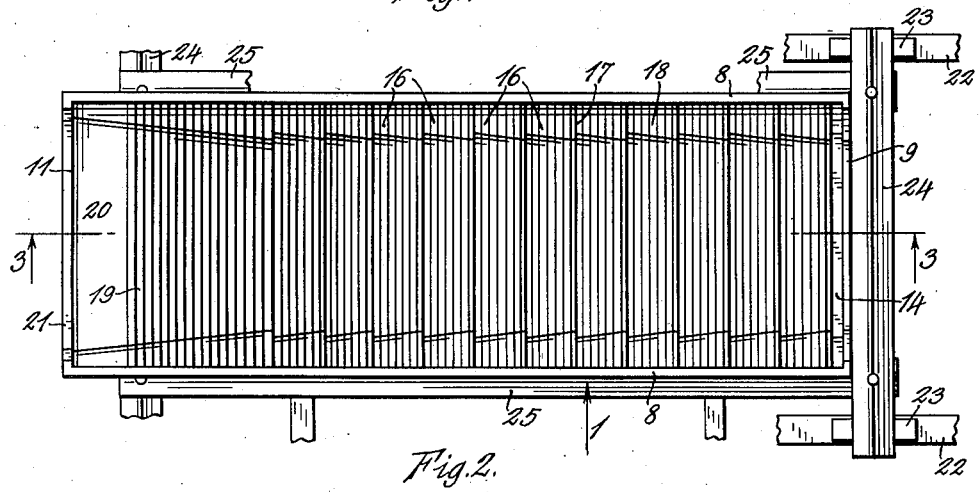
Fig. 2 is a top plan view of the riffle pan shown in Fig. 1.
Figure 3:
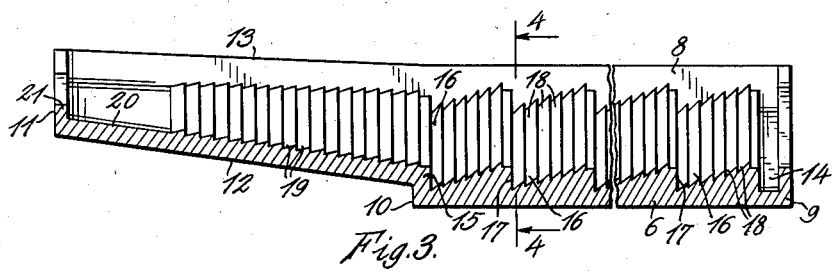
Fig. 3 is a longitudinal section of the riffle pan taken along line 3—3, Fig. 2.
Figure 4:
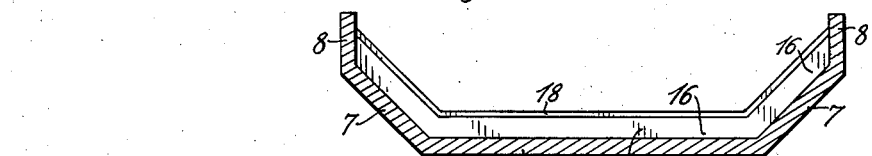
Fig. 4 is a transverse section taken on line 4—4, Fig. 3.

In the drawing reference numeral 6 designates the bottom of the improved riffle pan and reference numerals 7 designate the inclined sides of the riffle pan which terminate in vertically extending flanges 8. The bottom is preferably flat and is straight from the discharge end 9 to the shoulder 10, shown in Fig. 3. From the shoulder 10 to the receiving end 11, the bottom surface is upwardly inclined as designated by reference numeral 12. The upper edges of the vertical flanges 8 are also slightly upwardly inclined as indicated at 13, so as to conform to the bottom 12. The extreme end of the riffle pan where the material is discharged, is provided with a transversely extending groove 14 and the upper surface between the groove 14 and the vertical wall 15 which is located adjacent the shoulder 10, is provided with a number of parallel substantially triangular grooves 16. Each groove has the shape shown in cross section in Fig. 3 and the end walls 17 of the grooves will be referred to as the upper walls because when the riffle pan is in use, the bottom usually slants from the receiving to the discharge end. The grooves 16 extend upwardly along the inclined sides 7 as shown in Fig. 4. The upper surface of the bottom of each groove is provided with a plurality of parallel triangular shaped grooves 18. The upper surface of the bottom above the inclined portion 12 is provided with a plurality of grooves 19 of substantially the same shape as the grooves 18 in the bottoms of the riffle grooves. A smooth section 20 extends from the upper end of the group of grooves 19 to the upwardly extending flange 21. The riffle pan when in use, is preferably supported on a frame work like that illustrated in Figs. 1 and 2 in which reference numeral 22 designates a stationary frame member to the upper surface of which bearing blocks 23 are connected. Transversely extending angle irons 24 rest on the bearing blocks of which there are two pair, as shown in Fig. 2. The transversely extending angle irons 24 are connected by longitudinally extending angle irons 25 which serve to support the sheet metal supporting member 26 on which the riffle pan rests. The inclined bottom portion 12 usually rests on the top of the upper angle 24 as shown in Fig. 1.

When the riffle pan is in use, the frame on which it is supported is reciprocated transversely and the placer material and water are discharged onto the smooth surface 20 and continues to flow downwardly over the riffles 19 and over the large riffle grooves 16 with their smaller riffles 18 and the gangue is finally discharged at the discharge end 9. Due to the agitation and the flow of the placer material, the heavier particles, such as gold, platinum and other heavy precious materials sink and finally become deposited in the riffles where they are subjected to a gentle washing action by the liquid which flows through the riffle pan. Any large particles of valuable material are caught in the rectangular riffle 14. After the machine is operated for a certain length of time, the riffle pan is removed and washed so as to remove all the values from the riffles, after which it can be replaced and continue to function.

Particular attention is called to the specific form of the riffles, which, as above explained, are of triangular shape and have their upper surfaces provided with a number of spaced grooves or corrugations which prevent the flow of the placer material from carrying the gold and other previous metal along with the stream as would be the case if the upper surfaces of the riffle grooves were flat and smooth.

Due to the inclination of the riffle bottoms in the direction of pulp flow a continuous washing action is obtained that leaves the concentrate in a richer condition than can usually be obtained with riffles of the ordinary construction.

Since the riffle pan is subjected to transverse vibration, the inclined sides 7 and the vertical flanges 8 serve to prevent the pulp from splashing over the sides of the riffle pan during the time that the machine is in use.

Figure 5:
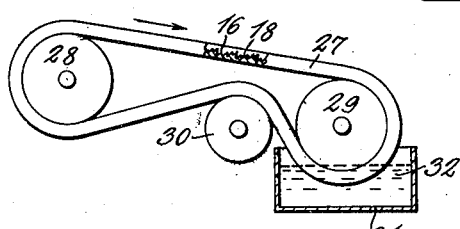
Fig. 5 is a diagrammatic view, partly in section, showing the riffle pan construction embodied in an endless belt form of riffle.

In machines having large capacity, the riffle pan can be made in the form of an endless belt as shown in Fig. 5 where such a riffle pan has been designated by reference numeral 27. This belt is supported on drums 28 and 29 and is usually provided on its lower surface with a supporting drum 30. A tank 31 is provided beneath the drum 29 and this tank contains water 32, whose level extends over the lower part of the riffle pan where it bends around the drum 29. This riffle pan is moved slowly in the direction of the arrow and is therefore cleaned by passing through the water 32. The bottom of the endless riffle pan is provided with grooves 16 and with smaller grooves 18 the same as the riffle pan shown in Fig. 3.

From the above description it will be seen that the riffle pan which forms the subject of this invention is of a peculiar construction and its characteristic feature resided in the combination of large transversely extending riffle grooves 16, whose supporting surfaces are provided with parallel riffle grooves 18. A riffle pan of this construction is easily molded from rubber composition and it can therefore be constructed at a very small cost and will last longer than the usual metal pan, first, because the rubber composition is very resistant to wear, and second, because it is not easily injured by rough handling.

Having described the invention what is claimed as new is:

1. An elongated riffle pan having its sides turned upwardly so as to form flanges, the portion of the bottom between the flanges being provided with transversely extending grooves formed in the material of the pan and whose upper walls are substantially vertical and whose bottoms are inclined in the direction of pulp flow, the bottoms of the grooves having their upper surfaces provided with longitudinal parallel grooves.

2. An elongated riffle pan of rubber composition, the edges of the riffle pan being bent upwardly so as to form flanges, the upper surface of the bottom being provided with transversely extending grooves of substantially triangular cross section, the upper wall of the groove being substantially perpendicular to the plane of the bottom of the riffle box, the bottom surface of each groove being inclined upwardly in the direction of the pulp flow, and provided with a plurality of parallel corrugations extending in the direction of the grooves.

3. An elongated riffle pan of rubber composition having its edges upwardly inclined so as to form a trough-like structure having a transversely flat bottom and upwardly and outwardly inclined flanges, the upper surface of the bottom and the inclined side flanges having a plurality of parallel grooves extending transversely of the riffle pan and across a portion of the upper surfaces of the flanges, the upper walls of the grooves being substantially perpendicular to the plane of the bottom, the bottom surfaces of the grooves being upwardly inclined in the direction of pulp flow, the bottom surface of each groove being provided with a plurality of parallel corrugations of substantially triangular cross section.

4. An elongated riffle pan of rubber composition having its edges upwardly and outwardly inclined to form flanges, the bottom being transversely flat, a portion of the bottom adjacent the receiving end being inclined downwardly in the direction of pulp flow, said inclined bottom surface being provided in its upper surface with transversely extending grooves of substantially triangular cross section, the bottom surface between the inclined bottom portion and the discharge end of the riffle pan being provided with transversely extending grooves of substantially triangular cross section, the upper walls of the grooves being substantially vertical and the bottoms upwardly inclined in the direction of pulp flow, the upper surfaces of the inclined bottoms being provided with a plurality of small grooves of substantially the same general cross sectional shape as the larger grooves.

5. A riffle pan in accordance with claim 4 in which the grooves extend upwardly along the inclined sides so as to terminate above the level of the bottom of the riffle pan.

6. A unitary riffle pan of flexible rubber composition and having its sides upwardly and outwardly inclined so as to form flanges, the bottom being transversely flat between the flanges, the bottom having a plurality of transversely extending grooves of substantially triangular cross section, the upper wall of each groove being substantially perpendicular and the bottom inclined upwardly in the direction of pulp flow, the upper surface of the groove bottom having each a plurality of parallel longitudinally extending corrugation.

LOUIS B. GOLDBERG.
NATHAN GOLDBERG.
WILLIAM GOLDBERG.
JACOB M. GOLDBERG.